Patented Feb. 13, 1945

2,369,182

UNITED STATES PATENT OFFICE 2,369,182

CONTROLLED OXIDATION OF UNSATURATED ORGANIC COMPOUNDS

Frederick F. Rust and William E. Vaughan, Berkeley, Calif., assignors to Shell Development Company, San Francisco, Calif., a corporation of Delaware No Drawing. Application March 27, 1943, Serial No. 480,862

12 Claims. (Cl. 260—533)

This invention relates to the controlled oxidation of unsaturated organic compounds, and more particularly pertains to the catalytic controlled oxidation of unsaturated organic compounds to produce valuable oxygenated products, such as unsaturated carboxylic acids, saturated and/or unsaturated ketones, and the like, which contain the same number of carbon atoms per molecule as the primary material treated. In one of its more specific embodiments, the invention is directed to the catalytic oxidation of unsaturated aliphatic and/or alicyclic hydrocarbons to produce unsaturated carboxylic acids, saturated and/or unsaturated ketones, and other unsaturated oxygenated hydrocarbons having the same number of carbon atoms per molecule as the unsaturated hydrocarbon subjected to oxidation.

The oxidation of various organic compounds has been effected for a number of years both non-catalytically and in the presence of catalysts. As a general rule, most if not all of these oxidations resulted in considerable decomposition, i. e. cleavage of the carbon-to-carbon bonds of the organic starting material. Also, the products of reaction of such oxidations usually contained various percentages of hydrocarbons which had been oxidized to a greater or lesser extent. For instance, the catalytic oxidation of aliphatic hydrocarbons, whether they be saturated or unsaturated, in accordance with the teachings of the prior art, formed mixtures containing various percentages of aldehydes, alcohols, acids, acetals, esters, ketones and other oxygenated compounds. These various oxygenated compounds contained varied numbers of carbon atoms per molecule due to the carbon-to-carbon scission as well as to other side-reactions, such as polymerization or condensation. Also, the oxidation of unsaturated hydrocarbons according to the prior art processes formed saturated oxygenated compounds which usually contained a lesser number of carbon atoms per molecule than the unsaturated hydrocarbons subjected to oxidation.

Although most of the oxygenated organic compounds formed as a result of the partial oxidation of hydrocarbons according to the known processes are generally more valuable than the primary materials subjected to such oxidation, it is frequently desirable to obtain predominantly carboxylic acids and/or ketones rather than mixtures containing them and large amounts of other various more or less oxygenated substances. Also, it is often desirable to obtain oxygenated compounds having the same number of carbon atoms per molecule as the starting organic material treated. Finally, it is desirable to obtain unsaturated carboxylic acids from unsaturated organic compounds, and particularly unsaturated carboxylic acids containing the same number of carbon atoms per molecule as the primary material, rather than the aforesaid mixtures predominating in saturated oxygenated compounds containing varied numbers of carbon atoms per molecule.

It is the main object of the present invention to provide a novel process whereby predetermined unsaturated oxygenated organic compounds, and particularly unsaturated carboxylic acids, may be obtained. Another object is to provide a process for the production of unsaturated carboxylic acids having the same number of carbon atoms per molecule as the starting organic material treated. Still another object of the invention is to provide a process whereby unsaturated organic compounds, particularly unsaturated aliphatic and/or alicyclic hydrocarbons, may be catalytically and directionally treated to produce economic yields of unsaturated oxygenated compounds, especially unsaturated carboxylic acids. A still further object is to provide a novel process for the controlled catalytic oxidation of aliphatic and/or alicyclic unsaturated hydrocarbons having three or more carbon atoms per molecule to form the corresponding unsaturated carboxylic acids, as well as other valuable oxygenated compounds, such as the saturated or unsaturated ketones and peroxides having the same number of carbon atoms per molecule as the starting organic material treated. The term "ketone," as employed herein, refers to organic compounds having one or more carbonyl groups, and therefore includes diketones.

It has now been discovered that the above and other objects may be attained by effecting the partial oxidation in the presence of hydrogen bromide. More specifically stated, the invention resides in the partial and controlled oxidation of unsaturated organic compounds, particularly of unsaturated aliphatic and/or alicyclic hydrocarbons, in the presence of a catalyst consisting of or comprising a hydrogen bromide, or of a compound capable of yielding hydrogen bromide under the operating conditions. In one of its more specific embodiments, the invention resides in the production of unsaturated carboxylic acids and, to a certain degree, of ketones, peroxides and/or halo-substituted derivatives, by the partial, controlled oxidation of hydrocarbons containing at least one unsaturated double bond, by subjecting this primary material, in the presence of a hydrogen bromide, or a substance capable of yielding hydrogen bromide under the operating conditions, to the action of oxygen under temperature and pressure conditions which are below those capable of causing the spontaneous combustion and therefore decomposition of the carbon structure of the starting organic material.

The above-outlined invention is predicated on the discovery that the presence of hydrogen bromide, during the oxidation of the above-mentioned and hereinbelow more fully described unsaturated organic compounds (particularly when the reaction is effected in the vapor phase and under the hereinbelow outlined operating conditions), controls the oxidation reaction so as to cause the oxygen to react with a saturated carbon atom instead of affecting the unsaturated or double bond of the starting organic material. For example, when propylene is subjected to oxidation in accordance with the present process, the resultant reaction mixture will contain oxygenated compounds predominating in acrylic acid, thus clearly illustrating the directional catalytic effect of hydrogen bromide during the partial and controlled oxidation of the mentioned unsaturated organic compounds in the presence of hydrogen bromide. Also, the presence of the hydrogen bromide or of compounds capable of yielding it under the employed operating conditions, besides retarding the explosion or complete combustion of the starting unsaturated organic material, apparently inhibits decomposition of the carbon structure of such organic materials, so that the resultant mixture predominates in oxygenated compounds containing the same number of carbon atoms per molecule as the starting organic material subjected to oxidation in accordance with the present process.

The unsaturated organic compounds which may be oxidized according to the process of the present invention include aliphatic and alicyclic hydrocarbons which contain one or more olefinic linkages between carbon atoms which may be of primary, secondary or tertiary character. In order to produce unsaturated carboxylic acids, these unsaturated hydrocarbons should contain at least three carbon atoms per molecule. Examples of hydrocarbons which may be oxidized according to the present process are ethylene, propylene, butene-1, butene-2, isobutylene, pentene-1, pentene-2, 3-methyl-butene-1, 2-methylbutene-1, 2-methyl-butene-2, hexene-2, 4-methyl-pentene-2, hexene-3, octene-2, cyclopentene, cyclo-hexene, 3-methyl cyclohexene, hexadiene-2,4, and their homologues and alkylated derivatives. Halogenated unsaturated organic compounds containing one or more halogen (i. e. chlorine, bromine, iodine and/or fluorine) atoms and one or more olefinic linkages, may also be oxidized according to this process. Examples of such halogenated hydrocarbons are allyl halides, 2-halo-propylene, crotyl halides, 3-halo-cyclopentene, 3-halo-cyclohexene, and the like, and their homologues. Other unsaturated organic compounds, such as the unsaturated alcohols of the type of allyl alcohol, as well as acids, keto-acids, and the like, may also be used as the starting materials. However, the present invention is particularly applicable to the controlled oxidation of the lower homologues of the aforementioned unsaturated hydrocarbons. In this connection it must be noted that the character of the oxygenated compound formed as a result of the oxidation in accordance with the process of the present invention will at least in part depend on the character of the unsaturated hydrocarbon treated. For instance, unsaturated hydrocarbons containing a terminal methyl radical, particularly when such radical is directly attached to an unsaturated carbon atom of secondary character, tend to produce unsaturated carboxylic acids, whereas unsaturated hydrocarbons which do not have such a terminal methyl radical may form oxygenated compounds predominating in or containing saturated ketonic compounds. Also, unsaturated aliphatic hydrocarbons containing a saturated tertiary carbon atom directly linked to an unsaturated carbon atom may form the corresponding tertiary alkenyl hydro-peroxide and/or di(tertiary alkenyl) peroxide. For example, whereas butene-1, when subjected to the controlled oxidation in accordance with the process of the present invention, produces 3-oxy-butene-1, isopropyl ethylene may form 3-methyl-3-hydroperoxy-butene-1, and the corresponding di(tertiary alkenyl) peroxide.

It was stated above that the non-explosive, slow and controlled oxidation of the above-described class of unsaturated organic compounds is effected in accordance with the process of the present invention at elevated temperatures which are below those at which spontaneous combustion or substantial degradation or decomposition of the carbon structure occurs. This upper temperature will at least in part depend on the specific organic substance treated as well as on the proportions thereof and or of the oxygen and hydrogen bromide present in the mixture subjected to the elevated temperatures. For instance, generally speaking, other conditions being equal, an increase in the hydrogen bromide content of a mixture will usually lower the temperature at which spontaneous combustion will occur. Also, it must be noted that excessively high temperatures, even though they may be below the explosive region, should be avoided because of certain undesirable side-reactions, such as excessive conversion of hydrogen bromide to alkyl or alkenyl bromides. Generally, it may be stated that for the lower boiling unsaturated aliphatic and alicyclic hydrocarbons, the upper temperature limit is in the neighborhood of 225° C., although with shorter contact periods this temperature may be raised to approximately 250° C., or even somewhat higher. Some of the more readily oxidizable unsaturated compounds may be economically oxidized in accordance with the present process at temperatures as low as about 150° C. With further decrease in the operating temperature the output of the product per unit time will decrease so that at temperatures of below about 100° C. the controlled oxidation in the presence of the aforementioned catalysts may become uneconomical.

The reaction may be effected in the liquid or vapor phase, or in a two-phase liquid-vapor system. Since it is difficult to maintain a desirable relatively high oxygen concentration when the reaction is conducted in the liquid phase, it is generally preferred to effect the oxidation according to the present invention in the vapor phase. Some of the relatively higher-boiling compounds cannot be effectively maintained in the vapor phase and in contact with sufficient concentrations of oxygen and of hydrogen bromide without causing the spontaneous combustion of such a mixture. The oxidation of such unsaturated organic compounds of the defined class may be readily effected in the presence of inert diluents or carriers such as steam, nitrogen, carbon dioxide and even methane, which latter is relatively stable at the temperatures at which the above-mentioned unsaturated organic compounds may be oxidized effectively according to the present invention. Although nitrogen is a highly suitable diluent, the use of steam is generally considered to be most advantageous because hydrogen bromide may then be removed from the reaction mixture as an overhead fraction in the form of its constant boiling mixture of hydrogen bromide and water.

The volumetric ratios of oxygen to the unsaturated organic starting material may vary within relatively wide limits. It may be generally stated that satisfactory yields of the desired oxygenated product or products may be obtained by using at least equivolumetric quantities of these two substances. An increase in the amount of oxygen in the treated mixture usually increases the yield of the desired unsaturated carboxylic acids. However, any undue increase in the ratio of oxygen to the starting material is generally dangerous because of excessive explosion hazards. On the other hand, the use of oxygen-to-hydrocarbon or oxygen-to-organic compound ratios which are considerably below equivolumetric will normally lower the output of the desired product or products per unit of time because of the presence of less oxygen per unit of space. This renders the process less economical, although operable, it being noted that the lowering of the oxygen-to-starting material ratio usually causes a faster consumption of oxygen per unit of time. Since the hydrogen bromide apparently acts as an explosion retardant or inhibitor it is possible to employ mixtures which contain excess quantities of oxygen. This in turn results in the production of higher yields of the desired oxygenated product or products.

The amount of hydrogen bromide as the catalyst may also vary within relatively wide limits, although optimum amounts or percentages may be readily determined for each individual starting material treated and for the specific operating conditions employed. Generally speaking, the percentage of oxygen which will react to form the desired oxygenated product or products will vary with a change in the hydrogen bromide concentration in the mixture subjected to treatment. This is particularly true in the case of the lower hydrogen bromide concentrations, i.e. when relatively small percentages of the hydrogen bromide are employed. Very high hydrogen bromide concentrations will cause excessive dilution and thus decrease the output of the desired product or products.

The oxidation in accordance with the process of the present invention may be effected at atmospheric pressures although higher or lower pressures may also be employed. In fact, it is generally preferable to employ superatmospheric pressures because more of the mixture subjected to treatment may be conveyed through a given unit of reaction space per unit of time.

The invention may be executed in a batch, intermittent or continuous manner. When operating in a continuous system all of the reactants as well as the diluents, if any of the latter are used, and the catalyst may be first mixed, and the mixture then conveyed through the whole length of the reaction zone. In the alternative, it is possible to introduce at least a part of the catalyst and/or of one or both of the reactants, i. e. oxygen and the unsaturated organic compound, at various points along the reaction zone. Such operation may be frequently desirable to control the operating conditions, e. g. temperature, in the reaction zone.

The residence time of the reactants in the reaction zone may also vary, and is at least in part dependent on the other operating conditions, such as the specific unsaturated organic material treated, the ratio thereof to the oxygen and/or the catalyst, the presence or absence of inert diluents, the operating temperatures and pressures, etc. In a continuous system, it has been found that satisfactory yields of the desired unsaturated carboxylic acids and/or of the ketones may be obtained with space velocities of between about 12 and about 20, although higher or lower space velocities may also be employed. The term "space velocity" as employed refers to the volume of the vapors of the unsaturated organic material conveyed through a unit volume of reaction space per hour.

Instead of using individual unsaturated organic compounds, e. g. individual unsaturated aliphatic or alicyclic hydrocarbons, it is possible to employ mixtures thereof. Also, instead of using pure or substantially pure oxygen for the oxidation in accordance with the present process, it is possible to employ oxygen-containing mixtures such as air, or even substances capable of yielding molecular oxygen under the operating conditions. Furthermore, although the examples presented hereinbelow are directed specifically to the use of hydrogen bromide as the catalyst, the process of the present invention may also be realized by using substances capable of yielding hydrogen bromide under the operating conditions employed.

The invention is illustrated by the following specific examples, it being understood that there is no intention of being limited by any details thereof, since many variations may be made within the scope of the claimed invention.

Example I

A Pyrex glass reactor was employed and was provided with a vapor bath to maintain the reactants at a constant and desired temperature throughout the reaction. A 2:2:1 vaporous mixture of propylene, oxygen and hydrogen bromide, respectively, was conveyed through the reactor at a space velocity of about 15, while the reaction temperature was maintained at about 224° C. An analysis of the reaction mixture showed that the yield, as based on the consumed propylene, was as follows:

|  | Per cent |
|---|---|
| Organic acids | 18.5 |
| Carbonylic compounds | 5.3 |
| Allyl bromide | 18.5 |

The organic acids predominated in acrylic acid, while the principal carbonylic compound formed was found to be bromo-acetone.

Example II

A 2:2:1 vaporous mixture of butene-2, oxygen and hydrogen bromide, respectively, was conveyed through the reactor mentioned in the previous example. The reactor was maintained at a temperature of about 217° C., while the space velocity employed was equal to about 15. It was found that the yield of crotonic acid was equal to about 16%, the yield of diacetyl was about 2.3%, and the yield of unsaturated bromides was about 25%. These percentages are based on the consumed butylene. In addition to the above reaction products, minor amounts of crotonaldehyde and acetaldehyde were also found in the reaction products.

*Example III*

A vaporous mixture consisting of one part of cyclohexene, one part of hydrogen bromide, four parts of oxygen, and four parts of nitrogen (employed as a diluent) was conveyed through the above-mentioned reactor at a space velocity of slightly over 15%. The reaction temperature was maintained at about 193° C. An analysis of the reaction products showed that about 6.3% of the cyclohexene introduced was converted to a ketone identified as Δ²cyclohexenone.

The alkenyl bromides, which are formed as a result of side reactions between the starting organic material and the hydrogen bromide catalyst are valuable compounds and find a wide use in the various chemical industries. However, if desired, they may be subjected to further oxidation in accordance with the process of the present invention to produce added amounts of brominated and/or unhalogented oxygenated products, e. g. substituted or unsubstituted unsaturated carboxylic acids.

We claim as our invention:

1. A process for the production of acrylic acid and allyl bromide which comprises subjecting a vaporous mixture containing substantially equivolumetric quantities of propylene and oxygen, at substantially atmospheric pressure and at a temperature of about 225° C., to the action of hydrogen bromide catalyst for a period of time sufficient to effect the controlled catalytic oxidation of the propylene, and recovering acrylic acid and allyl bromide from the reaction mixture thus formed.

2. A process for the production of acrylic acid which comprises subjecting a vaporous mixture of propylene and oxygen to the action of hydrogen bromide at a temperature of between about 100° C. and the temperature at which spontaneous combustion occurs, effecting the reaction for a period of time sufficient to cause the controlled catalytic oxidation of the propylene, and recovering acrylic acid from the reaction mixture thus formed.

3. A process for the production of crotonic acid and of diacetyl which comprises subjecting a vaporous mixture containing substantially equivolumetric quantities of butene-2 and of oxygen, at substantially atmospheric pressure and at a temperature of about 200° C., to the action of hydrogen bromide for a period of time sufficient to effect the controlled catalytic oxidation of the butylene, and separately recovering crotonic acid and diacetyl from the resultant reaction mixture.

4. A process for the production of crotonic acid which comprises subjecting a vaporous mixture containing butene-2 and oxygen to the action of hydrogen bromide at a temperature of between about 100° C. and the temperature at which spontaneous combustion occurs, effecting the reaction for a period of time sufficient to cause the controlled catalytic oxidation of the butylene and recovering crotonic acid from the resultant reaction mixture.

5. A process for the production of desirable oxygenated products which comprises subjecting a vaporous mixture containing an unsaturated aliphatic hydrocarbon and oxygen to the action of hydrogen bromide at a temperature of between about 100° C. and the spontaneous combustion temperature of the mixture, and effecting the reaction for a period of time sufficient to cause the controlled catalytic oxidation of the unsaturated aliphatic hydrocarbon.

6. A process for the production of cyclohexenone which comprises subjecting a vaporous mixture containing cyclohexene and oxygen to the action of hydrogen bromide at a temperature of about 200° C. and for a period of time sufficient to effect the controlled catalytic oxidation of the cyclohexene and recovering cyclohexenone from the resultant reaction mixture.

7. The process according to claim 6 wherein an inert diluent is employed as a carrier for the cyclohexene.

8. A process for the production of cyclohexenone which comprises subjecting a vaporous mixture containing cyclohexene and oxygen to the action of hydrogen bromide at an elevated temperature which is below the spontaneous combustion temperature of the mixture, effecting the reaction for a period of time sufficient to cause the controlled catalytic oxidation of the cyclohexene and recovering cyclohexenone from the resultant reaction mixture.

9. A process for the production of desirable oxygenated products and unsaturated halogenated products which comprises subjecting a vaporous mixture containing an unsaturated alicyclic hydrocarbon and oxygen to the action of hydrogen bromide at an elevated temperature which is below the spontaneous combustion temperature of the mixture, and effecting the reaction for a period of time sufficient to cause the controlled catalytic oxidation of the unsaturated alicyclic hydrocarbon.

10. In a process for the production of desirable oxygenated products and unsaturated halogenated products, the steps of subjecting vapors of a compound selected from the class consisting of unsaturated aliphatic and alicyclic hydrocarbons to the action of oxygen in the presence of hydrogen bromide, and effecting the reaction at a temperature of between about 100° C. and the spontaneous combustion temperature of the mixture.

11. In a process for the production of desirable products, the step of subjecting vapors of an unsaturated organic compound containing an olefinic linkage between two carbon atoms of aliphatic character to the action of oxygen in the presence of hydrogen bromide and at a temperature of between about 100° C. and the temperature at which spontaneous combustion and the resultant decomposition of the carbon structure of the starting unsaturated organic compound occur.

12. In a process for effecting controlled oxidation and for the production of desirable oxygenated products, the step of subjecting an unsaturated organic compound to the action of oxygen and of hydrogen bromide at a temperature of between about 100° C. and the temperature at which spontaneous combustion occurs.

FREDERICK F. RUST.
WILLIAM E. VAUGHAN.

CERTIFICATE OF CORRECTION.

Patent No. 2,369,182. February 13, 1945.

FREDERICK F. RUST, ET AL.

It is hereby certified that error appears in the printed specification of the above numbered patent requiring correction as follows: Page 4, second column, lines 24 and 25, and lines 36 and 37, claims 8 and 9 respectively, for "an elevated temperature which is below" read --a temperature of between about 100° C. and--; and that the said Letters Patent should be read with this correction therein that the same may conform to the record of the case in the Patent Office.

Signed and sealed this 27th day of November, A. D. 1945.

Leslie Frazer (Seal) First Assistant Commissioner of Patents.